United States Patent [19]
Hirano et al.

[11] Patent Number: 5,765,929
[45] Date of Patent: Jun. 16, 1998

[54] BRAKING CONTROL SYSTEM FOR MOTOR VEHICLE

[75] Inventors: Yutaka Hirano; Akira Eiraku, both of Susono; Shinichi Soejima, Toyota, all of Japan

[73] Assignee: Toyota Jidosha Kabushiki Kaisha, Toyota, Japan

[21] Appl. No.: 682,995

[22] Filed: Jul. 18, 1996

[30] Foreign Application Priority Data

Jul. 20, 1995 [JP] Japan .................................. 7-184181

[51] Int. Cl.$^6$ .................................................. B60T 8/00
[52] U.S. Cl. .................................... 303/112; 303/167
[58] Field of Search ........................... 303/112, 167, 303/168, 171, 172, 173, 113.2; 364/426.01–426.03

[56] References Cited

U.S. PATENT DOCUMENTS 5,205,622  4/1993  Gee ............................. 303/112 X
5,333,943  8/1994  Kashiwabara et al. ........ 303/112

FOREIGN PATENT DOCUMENTS

A-3-227763  10/1991  Japan .
A-5-2197    1/1993   Japan .
A-5-502422  4/1993   Japan .

*Primary Examiner*—Peter M. Poon
*Attorney, Agent, or Firm*—Oliff & Berridge, PLC

[57] ABSTRACT

A braking control system for a motor vehicle in which various braking controls, including an antiskid braking control and a traction control, are realized comprehensively, accurately and smoothly without being based on the slip factor of a wheel. The actual wheel speed (Wvr) of the rear wheel side is detected, and the desired wheel speed (Wrf) of the front wheel side is set so as to be lower than the actual wheel speed (Wvr). Besides, the actual wheel speed (Wvf) of the front wheel side is detected, and the deviation (ef) between the actual wheel speed (Wvf) and the desired wheel speed (Wrf) is detected. Subsequently, the desired braking torque (Nrf) of the front wheel side is calculated from the deviation (ef) and the actual wheel speed (Wvf). Further, the desired braking torque (Nrr) of the rear wheel side is set on the basis of the desired braking torque (Nrf). The braking pressure of the braking apparatus is controlled so as to establish the desired braking torques (Nrf) and (Nrr).

7 Claims, 10 Drawing Sheets

BRAKING CONTROL SYSTEM FOR MOTOR VEHICLE

BACKGROUND OF THE INVENTION

1. Field of the Invention

The present invention relates to a braking control system for a motor vehicle. More particularly, it relates to a novel braking control system for a motor vehicle the braking control of which is not based on the concept of a slip factor (or rate).

2. Description of the Prior Art

There have heretofore been well known vehicular braking control systems each of which is furnished with braking means which controls the braking force of a motor vehicle independently of a driver's braking operation.

By way of example, the official gazette of Japanese Patent Applicaiton Laid-open No. 502197/1993 discloses the vehicular braking control system which realizes an antiskid braking control (abbreviated to "ABS") for preventing the lock of a wheel (tire) in the braking mode of the motor vehicle, in other words, the excessive slip of the wheel relative to the touching ground surface thereof.

In this braking control system, the desired slip factor of each wheel is set, and the braking pressure of the aforementioned braking means for the pertinent wheel is controlled so that the actual slip factor of the wheel may come into agreement with the desired slip factor thereof.

The official gazette of Japanese Patent Application Laid-open No. 227763/1991 discloses the vehicular braking control system which realizes a traction control (abbreviated to "TRC") for preventing the slip of a wheel (tire) in the acceleration mode of the motor vehicle, in other words, the excessive slip of the wheel relative to the touching ground surface thereof.

In this braking control system, the desired slip factor of the driving wheel is set, and the braking pressure of the aforementioned braking means for the driving wheel is controlled so that the actual slip factor of the driving wheel may come into agreement with the desired slip factor thereof.

The official gazette of Japanese Patent Application Laid-open No. 02422/1993 discloses the vehicular braking control system which realizes a vehicle stability control (abbreviated to "VSC") for suppressing any unstable behavior when the motor vehicle has moved unstably.

In this braking control system, in order to suppress the unstable behavior, the desired slip factors of right and left wheels (tires) are altered and set, and a difference is afforded between the braking pressures for the right and left wheels in the aforementioned braking means, thereby to stabilize the motor vehicle.

All of these braking control systems in the prior art are common in the point that the desired slip factor of the wheel is set, and that the braking pressure of the braking means is controlled so as to bring the actual slip factor of the wheel to the desired slip factor thereof.

In general, in realizing a control based on a slip factor, a method is adopted wherein the valve switching time of a hydraulic actuator for controlling the braking pressure of braking means is determined in accordance with "a reverse hydraulic pressure model" of the actuator.

However, the control technology based on the slip factor as stated above involves several fundamental problems in itself and cannot realize the best braking control, especially a comprehensive braking control for controlling the motor vehicle from an overall viewpoint.

It is very effective for better understanding of the present invention to grasp the problems, which shall therefore be explained in more detail here.

1) First Problem

The first problem of the control based on the slip factor is that the optimal desired slip factor itself changes greatly, depending upon the drive environment of the motor vehicle.

In general, the slip factor (or rate) S of a wheel and a braking force NS (which the wheel can receive from the touching ground surface thereof) have the relationship of so-called "μ-S characteristics" as illustrated in FIG. 10. When the braking pressure of the braking means is raised, the slip factor S increases along the axis of abscissa. Until the braking pressure becomes a value corresponding to the peak μp of the curve of the μ-S characteristics, the braking force NS which the wheel receives from the touching ground surface rises following up the increase of the slip factor S.

In contrast, when the braking pressure is applied beyond the peak μp, the aspect of braking changes from the braking of the motor vehicle to that of only the tire due to the increase of the slip factor S. As a result, the wheel locks easily even under the same braking pressure, and the braking force NS which the wheel receives from the touching ground surface decreases abruptly.

The prior-art control based on the slip factor has a fundamental concept that, in the case where the braking pressure has exceeded the peak μp of the curve of the μ-S characteristics and where the wheel has consequently shown the tendency to lock, the braking pressure is lowered to decrease the slip factor S and to prevent the sudden lock of the wheel.

From this viewpoint, it is said that the desired slip factor in the prior-art braking control should ideally be set somewhat smaller than a slip factor Sp corresponding to the peak μp of the curve of the μ-S characteristics.

As seen from FIG. 10, however, the concrete curve of the μ-S characteristics changes greatly, depending upon the friction coefficient μ of the road surface (shortly termed the "road surface μ"). It is also known that the characteristics curve changes greatly due to the mere change of the steering angle of the steering wheel of the motor vehicle. These facts signify that the optimal desired slip factor itself changes greatly, depending upon the road surface μ and the drive state of the motor vehicle. In other words, in the prior-art control based on the slip factor, the desired slip factor forming the backbone of the control, per se, changes greatly, depending upon the drive environment of the motor vehicle. This is the first problem of the control based on the slip factor.

2) Second Problem

The second problem is that the actual slip factor of the wheel cannot be precisely detected. In the control of bringing the actual slip factor into agreement with the desired slip factor, it is indispensable to precisely detect the actual slip factor at the current time. The actual slip factor S of the wheel is defined by an expression; $S=(Va-W)/Va$, where symbol W denotes the wheel speed of the particular wheel, while symbol Va denotes the true vehicle speed of the motor vehicle (the ground speed of the motor vehicle). For the precise detection of the actual slip factor, therefore, it is inevitably required to precisely detect the true vehicle speed.

In that state of the motor vehicle in which the slip is problematic, however, it is naturally impossible to precisely estimate the true vehicle speed from only the wheel speed. Accordingly, many of the present-day braking control systems are constructed as stated below. The maximum wheel speed is obtained from among the four wheel speeds of the motor vehicle, and it is substituted for the vehicle speed. Furthermore, when the maximum wheel speed obtained has come to drop suddenly due to the locking of the four wheels, the vehicle speed is guarded by the maximum vehicle deceleration (which is a supposed deceleration beyond which the motor vehicle cannot be decelerated). Thenceforth, the vehicle speed is estimated to lower in accordance with the maximum deceleration with time.

Needless to say, it is not possible at all to estimate the precise vehicle speed by this method. With the intention of mitigating the problem even slightly, there have hitherto been proposed various techniques in each of which the vehicle speed is estimated more precisely by, for example, employing the motion model of the motor vehicle or the characteristics model of the tire, or preparing an acceleration sensor (G sensor) separately.

However, even with these techniques, actually, it is difficult to precisely detect the vehicle speed. As long as the vehicle speed is not precisely obtained, the actual slip factor which is calculated on the basis of the vehicle speed cannot be precisely obtained, either. In this manner, it is the second problem of the prior-art control based on the slip factor that the actual slip factor serving as the index of the control cannot be precisely evaluated.

3) Third Problem

The third problem is that any control algorithm used in the prior-art control based on the slip factor cannot intrinsically realize the best control even when the control performance of the control system itself is enhanced.

As stated before, although the various methods of estimating the vehicle speed have been proposed, the true vehicle speed cannot be precisely detected at present. Especially after increasing the slip of the wheel, namely, during the most important period in the braking control, it is common practice that, as explained before, the estimative vehicle speed is merely given so as to greatly lower in accordance with the maximum deceleration.

In consequence, also the desired wheel speed which is evaluated on the basis of the estimative vehicle speed ought to lower abruptly at a rate corresponding to this vehicle speed. As illustrated in FIG. 11, accordingly, in the case where the control performance of the control system is excellent, the actual wheel speeds W of all of the four wheels follow up the desired wheel speed Wr lowering abruptly, at high fidelity. Thus, the four wheels lock suddenly and simultaneously.

Since the braking control system in the prior art cannot find the road surface μ, it is actually operated in conformity with such control logic of If-Then type that the braking pressure of the control means is gradually raised and that, when the wheel is detected to have slipped greatly and shown the tendency to lock, the braking pressure is lowered. As illustrated in FIG. 12, therefore, any wheel speed (W1 or W2) is always oscillating between a value in the vicinity of slip 0 (zero) and a value in the vicinity of the lock. Accordingly, the actual wheel speed follows up the desired wheel speed Wr slowly, and it is consequently estimated to have lowered in accordance with a somewhat moderate deceleration (in spite of the abrupt drop of the original desired wheel speed Wr itself).

However, in case of adopting a control loop of high control accuracy as in, for example, a PID (proportional-integral-derivative) control, the actual wheel speed ought to drop abruptly when the desired wheel speed drops abruptly with the sudden lowering of the estimative vehicle speed. In this case, therefore, the inconvenience is rather actualized.

In this manner, the logic which is used in the prior-art control system based on the slip factor has the contradiction that the inconvenience is rather incurred by enhancing the performance of the control system. This contradiction forms the third problem.

4) Fourth Problem

The fourth problem is as follows: With the method wherein the braking pressure of the braking means is controlled on the basis of the desired slip factor or any parameter founded thereon (for example, the desired wheel speed obtained by multiplying the actual wheel speed by the desired slip factor), it is difficult to realize the comprehensive braking control which associates, for example, the ABS, the TRC, and the VSC conforming to the behavior or state of the motor vehicle.

By way of example, in the case where the valve switching time of the actuator is evaluated by the use of the reverse hydraulic pressure model in order to obtain the braking pressure correspondent to the desired slip factor, it is the actual situation that a mere orifice is usually supposed as a valve model, whereupon the valve switching time is calculated in accordance with the static model. In the practical hydraulic control system, however, a high accuracy of control cannot be secured unless the change of the rigidity of piping is considered. Further, the correspondent braking pressure cannot be evaluated at a satisfactory accuracy unless the valve switching time is calculated in accordance with a dynamic model in which even the motion of the motor vehicle, the gain and phase of the actuator, the hydraulic pressure characteristics of the actuator, etc. are taken into consideration.

The prior-art control system therefore has the problem that, for example, the gain and phase of the actuator or the hydraulic pressure characteristics thereof sometimes fail to appropriately match with the actual behavior of the motor vehicle, so the control of the braking force does not always become the optimal vehicle stability control.

In other words, with the method wherein the "desired braking pressure" is evaluated directly from the desired slip or any parameter founded thereon, there is the problem that, even when such desired braking pressures are calculated for the right and left wheels independently of each other by way of example, the resulting "actual allotment of braking torques to the right and left wheels" does not always match favorably with the real slip state or behavior of the motor vehicle, i. e., with the "necessary allotment of braking torques to the right and left wheels".

As a matter of fact, therefore, it is actually difficult that the control of the braking forces is positively utilized, not only for the ABS or the TRC, but also for the VSC intended to control the behavior or attitude of the motor vehicle so as to develop into a system which realizes the comprehensive braking control.

SUMMARY OF THE INVENTION

The present invention has been made in view of the problems of the prior art as stated above, and has for its object to provide a quite novel braking control system for a motor vehicle in which the prior-art braking control system based on the slip factor is drastically reconsidered, which can realize a braking control of lower cost and higher accuracy, and which can smoothly associate the ABS, the TRC, the VSC or/and-the likes, thereby to control the motor vehicle from a more comprehensive viewpoint.

As has its purport shown in FIG. 1, the aspect of performance of the present invention as defined in Claim 1 has achieved the above object by a braking control system for a motor vehicle which has the following structures. That is, the braking control system comprises means for detecting an actual wheel speed of a front wheel side of the motor vehicle; means for detecting an actual wheel speed of a rear wheel side of the motor vehicle; means for setting that desired wheel speed of the front wheel side which is lower than the actual wheel speed of the rear wheel side, on the basis of the detected actual wheel speed of the rear wheel side; means for calculating a deviation between the desired wheel speed of the front wheel side and the actual wheel speed thereof; means for calculating a desired braking torque of the front wheel side on the basis of the deviation of the front wheel side and the actual wheel speed thereof; means for setting a desired braking torque of the rear wheel side on the basis of the desired braking torque of the front wheel side; and means for controlling a braking pressure of the braking means on the basis of the desired braking torque of the front wheel side and the desired braking torque of the rear wheel side.

The aspect of performance as defined in Claim 2 has similarly achieved the above object by a braking control system for a motor vehicle as defined in Claim 1, further comprising means for detecting whether or not the actual wheel speed of the rear wheel side has become lower than the actual wheel speed of the front wheel side; wherein upon the detection that the actual wheel speed of the rear wheel side has become lower than the actual wheel speed of the front wheel side, the desired braking torque of the rear wheel side is set so that the former actual wheel speed may become equal to the latter one.

The aspect of performance as defined in Claim 3 has similarly achieved the above object by a braking control system for a motor vehicle as defined in Claim 1, further comprising means for judging whether or not a braking torque of the rear wheel side is substantially in a maximum condition of the braking control system; wherein upon the judgement that the braking torque of the rear wheel side is substantially in the maximum condition, the desired wheel speed of the front wheel side to be set lower relative to the actual wheel speed of the rear wheel side is set still lower.

The aspect of performance as defined in Claim 4 has similarly achieved the above object by a braking control system for a motor vehicle as defined in Claim 1, further comprising means for detecting whether or not the rear wheel side has a tendency to lock; wherein upon the detection that the rear wheel side has the tendency to lock, the braking pressure of the braking means for the rear wheel side is lowered.

The aspect of performance as defined in Claim 5 has similarly achieved the above object by a braking control system for a motor vehicle as defined in Claim 1, further comprising means for detecting vehicle behavior characteristics; and means for calculating a second desired braking torque which serves to generate a braking torque difference in a lateral direction of the motor vehicle, on the basis of the vehicle behavior characteristics; wherein the means for controlling the braking pressure of the braking means controls the braking pressure by taking also the second desired braking torque into consideration.

The aspect of performance as defined in Claim 6 has similarly achieved the above object by a braking control system for a motor vehicle as defined in Claim 1, further comprising forcible-braking-force impartation means for forcibly imparting a braking force when a specified condition is met; and means for calculating a third desired braking torque on the basis of the braking force imparted by the forcible-braking-force impartation means; wherein the means for controlling the braking pressure of the braking means controls the braking pressure by taking also the third desired braking torque into consideration.

The aspect of performance as defined in Claim 7 has similarly achieved the above object by a braking control system for a motor vehicle of two-wheel drive with driving wheels and driven wheels, wherein braking means capable of controlling a braking force of the motor vehicle independently of a braking operation done by a driver of the motor vehicle is installed in order to prevent the motor vehicle from slipping during acceleration thereof, comprising means for detecting an actual wheel speed of a driving wheel side of the motor vehicle; means for detecting an actual wheel speed of a driven wheel side of the motor vehicle; means for setting that desired wheel speed of the driving wheel side which is higher than the actual wheel speed of the driven wheel side, on the basis of the detected actual wheel speed of the driven wheel side; means for calculating a deviation between the desired wheel speed of the driving wheel side and the actual wheel speed thereof; means for calculating a desired braking torque of the driving wheel side on the basis of the deviation of the driving wheel side and the actual wheel speed thereof; and means for controlling a braking pressure of the braking means on the basis of the desired braking torque of the driving wheel side.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein.

DETAILED DESCRIPTION OF THE PREFERRED EMBODIMENTS

An aspect of performance (embodiment) corresponding to Claim 1 will now be described.

The aspect of invention defined in Claim 1 eliminates all of the foregoing first – fourth problems of the braking control based on the slip factor.

To begin with, in order to eliminate the first and second problems, any of the parameters of the desired slip factor, vehicle speed and actual slip factor is not used in carrying out the braking control.

Furthermore, in order to eliminate the third problem, the present invention defined in Claim 1 has noted "a certain fact" to seek a desired value which incurs no inconvenience even when the control performance of the control system is enhanced (a desired value which can produce a better result as the control performance of the control system is enhanced more)

The fact is that "in general, in order to stabilize the behavior or movement of the motor vehicle, the braking force of the rear wheel side is normally or always set somewhat smaller than that of the front wheel side". This forms the basis of the control according to the present invention.

That is, when the desired wheel speed of the front wheel side is set so as to always become lower than the actual wheel speed of the rear wheel side within a range in which the rear wheel side does not tend to lock, the simultaneous lock of the four wheels referred to in the third problem can be prevented.

Figure 10:
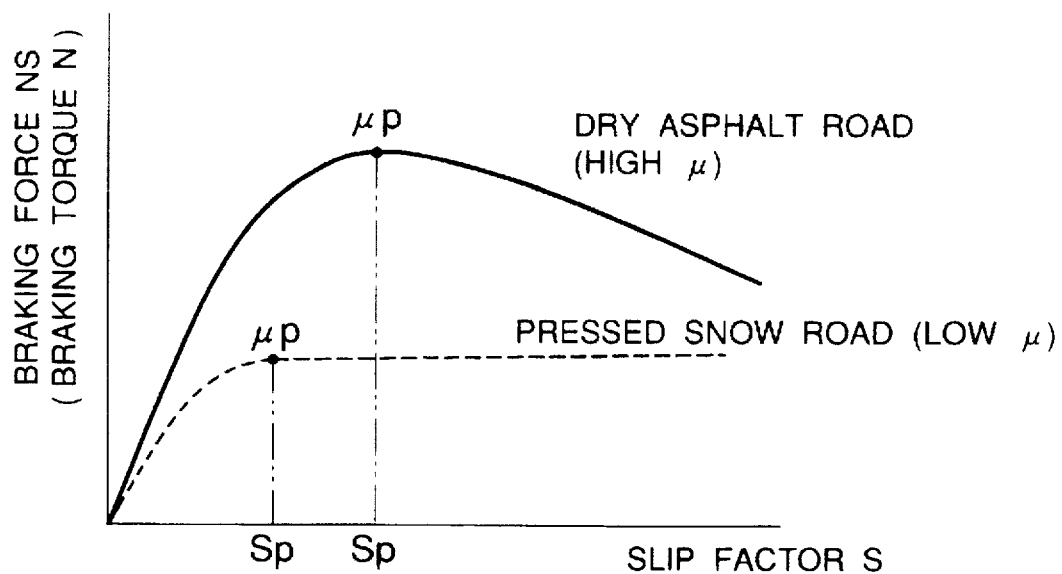
FIG. 10 is a graph showing the µ-S characteristics referred to above concerning FIG. 2.
Figure 11:
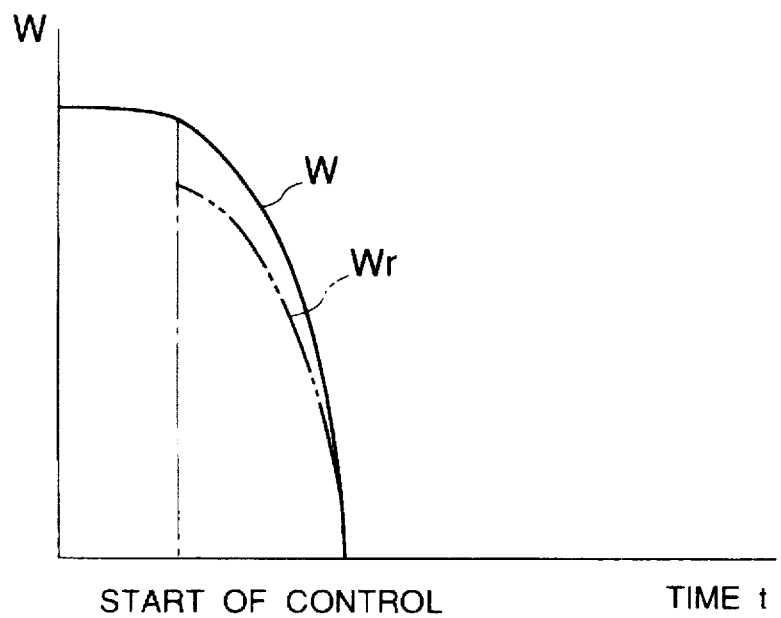
FIG. 11 is a graph showing a situation where an actual wheel speed ideally changes along a desired wheel speed.
Figure 12:
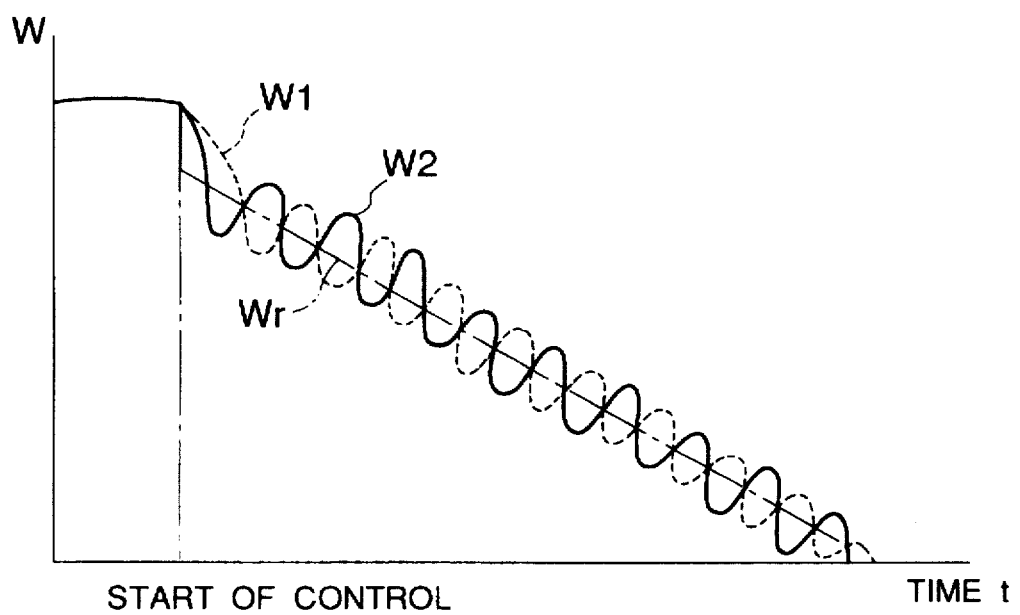
FIG. 12 is a graph showing a situation where an actual wheel speed follows up a desired wheel speed in the prior art.

With this measure only, however, the best slip factor near the peak $\mu P$ of the curve of the $\mu$-S characteristics as shown in FIG. 10 cannot be attained. In the aspect of performance defined in Claim 1, therefore, the concept of a "braking torque" has been introduced in order that the braking state (slip state) of the front wheel side may be brought toward the state thereof which corresponds to the peak $\mu P$ of the $\mu$-S characteristics curve, and that the fourth problem explained before may be solved concurrently.

As a practicable aspect of performance, it can be considered one in which the braking state is approached toward the peak $\mu P$ in conformity with an algorithm as explained in the following. It is now supposed that the actual wheel speed of the rear wheel side is Wvr at the start of the control. On this occasion, the desired wheel speed Wrf of the front wheel side is set as indicated by Eq. (1) below, that is, it is set lower than the actual wheel speed Wvr of the rear wheel side in proportion to a predetermined rate Srr. Here, the predetermined rate Srr neither has any relation with the "desired slip factor" in the prior art, nor has any relation with the "actual slip factor".

$$Wrf = Wvr(1-Srr), \quad 0 < Srr < 1 \tag{1}$$

Subsequently, the desired braking torque Nrf of the front wheel side is calculated using the following Eqs. (2) and (3) by way of example:

$$Nrf = Kpf \cdot ef + Kdf \cdot dWvf/dt + Kif \int ef \, dt + Cf \tag{2}$$

$$ef = Wvf - Wrf \tag{3}$$

Here, symbols Kpf, Kdf and Kif denote the control gains of the PID control concerning the front wheel side, respectively. Symbol Cf denotes the initial value of the desired braking torque Nrf of the front wheel side, while symbol Wvf denotes the actual wheel speed of the front wheel side. The initial value Cf is considered as being that reference value of the front-wheel-side desired braking torque Nrf which corresponds to the average deceleration of the motor vehicle. For example, this initial value Cf can be set at a product which is obtained in such a way that a value Vn calculated by smoothing the maximum value of the wheel speeds of the four wheels is multiplied by a predetermined coefficient. As is self-explanatory, symbol ef denotes the deviation of the actual wheel speed Wvf of the front wheel side from the desired wheel speed Wrf thereof.

Subsequently, in order to bring the braking state of the rear wheel side toward the peak $\mu P$ of the $\mu$-S characteristics curve, the desired braking torque Nrr of the rear wheel side is determined on the basis of the following Eq. (4) by way of example:

$$Nrr = \alpha \cdot Nrf (0 < \alpha) \tag{4}$$

A situation where the braking state is brought toward the peak pP of the $\mu$-S characteristics curve by the above construction will be described with reference to FIG. 2.

Now, unless the predetermined rate Srr is 0 (zero), the front-wheel-side desired wheel speed Wrf is infallibly set lower than the rear-wheel-side actual wheel speed Wvr in accordance with Eq. (1). As a result, when a state ① is assumed as the braking state of the rear wheel side at the current point of time by way of example, the braking state of the front wheel side is first approached to a state ②. Here, the front-wheel-side desired braking torque Nrf corresponding to the front-wheel-side desired wheel speed Wrf, in other words, to the state ② is calculated as a value ③ on the basis of Eq. (2). Subsequently, the rear-wheel-side desired braking torque Nrr is calculated as a value ④ by multiplying the front-wheel-side desired braking torque Nrf by the predetermined rate $\alpha$ in accordance with Eq. (4).

Figure 1:
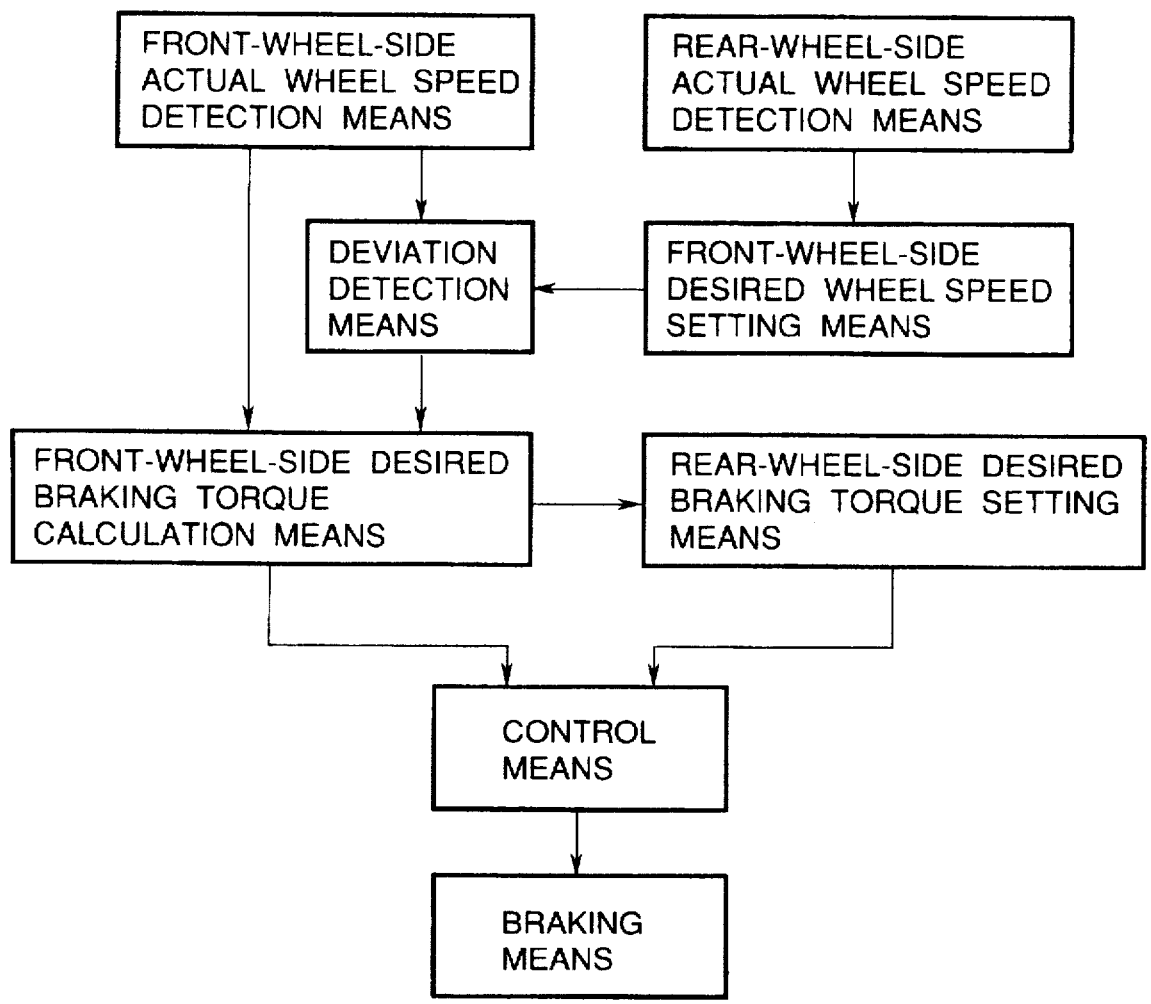
FIG. 1 is a block diagram showing the purport of the present invention.
Figure 2:
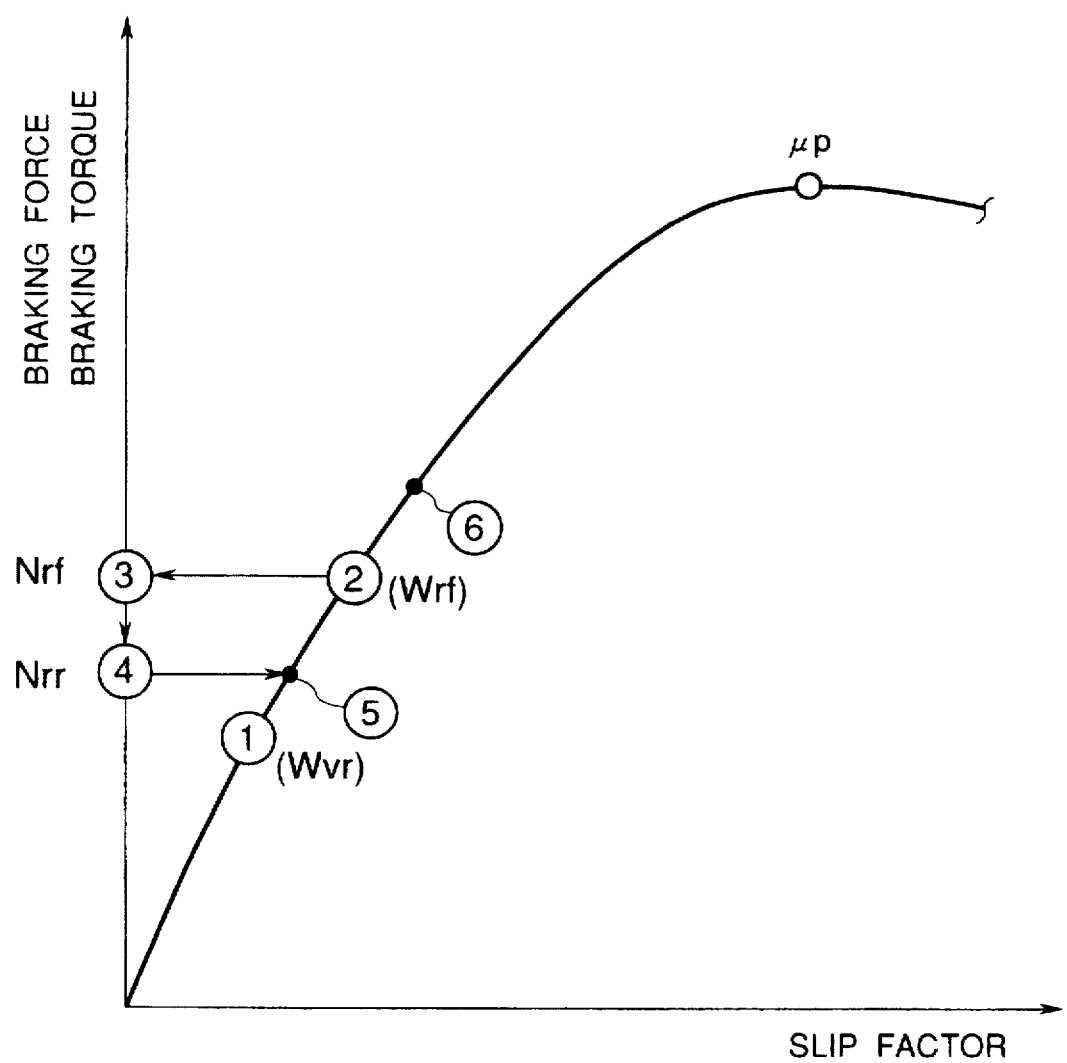
FIG. 2 is a partial enlarged diagram of µ-S characteristics illustrated in FIG. 10.

As seen from FIG. 2, if the predetermined rate $\alpha$ has a certain large value, the rear-wheel-side desired braking torque Nrr corresponding to the value ④ approaches the braking state of the rear wheel side up to a state ⑤ which is closer to the peak $\mu P$ than the state ①. Accordingly, the quantity $\alpha$ corresponds to the rate or speed at which the braking state is brought toward the peak $\mu P$.

Thus, the braking state of the rear wheel side is brought from the state ① to the state ①. Thenceforth, calculations similar to the above calculations for the states ①-⑤ are successively iterated with respect to the state ①.

After the braking state has come near to the peak $\mu P$ of the $\mu$-S characteristics curve in this way, the braking state (slip state) of the front wheel side goes beyond the peak $\mu P$ in due course, and the front wheel side shows the tendency to lock. In this state, however, the deviation ef enlarges in its minus direction abruptly in accordance with Eq. (3) and reduces the desired braking torque Nrf of the front wheel side in accordance with Eq. (2). As a result, the braking control shifts into the direction of releasing the lock, namely, into the direction of lowering the braking pressure. Thus, the braking state of the front wheel side is controlled into the vicinity of the peak $\mu P$ at this point of time. Accordingly, the braking state of the rear wheel side is naturally controlled into a state which lies somewhat on the left hand of that of the front wheel side as viewed in FIG. 2, but which is also vicinal to the peak $\mu P$.

In this way, the braking states can be efficiently brought near to the peak $\mu P$ of the curve of the $\mu$-S characteristics with the simultaneous lock of the four wheels avoided.

As clearly understood from the above description, the parameter of the "desired slip factor", "vehicle speed" or "actual slip factor" is not used on any occasion in the series of controls. Incidentally, practicable methods for evaluating the braking pressures of the braking means from the desired braking torques Nrf and Nrr obtained in the above way will be explained in detail later.

Next, an aspect of performance corresponding to Claim 2 will be described.

The foregoing control logic holds true in an ideal state, that is, in a case where the μ-S characteristics are identical and unchangeable for all the wheels throughout the braking control. In actuality, however, the rear wheel side will sometimes show the tendency to lock earlier than the front wheel side due to, for example, the road surface of the rear wheel side slipperier than that of the front wheel side. In such a case, with the logic stated before, the front wheels have their slip factors increased following up the rear wheels. Accordingly, the simultaneous lock of the four wheels might occur.

Therefore, in a case where the rear-wheel-side actual wheel speed Wvr has become lower than the front-wheel-side actual wheel speed Wvf, the rear-wheel-side desired wheel speed Wrr is set at the front-wheel-side actual wheel speed Wvf at that point of time, and the rear-wheel-side desired braking torque Nrr is directly determined by the PID control.

In this case, the rear-wheel-side desired braking torque Nrr is not calculated in accordance with Eq. (4) mentioned before, but is calculated on the basis of Eqs. (5) and (6) below. Thus, the rear-wheel-side desired braking torque Nrr is reduced so as to bring the rear-wheel-side actual wheel speed Wvr back to the front-wheel-side actual wheel speed Wvf, so that the earlier lock of the rear wheel side is avoided.

$$Nrr = Kpr \cdot er + Kdr \cdot dWvr/dt + Kir \cdot \!\int\! er\, dt + Cr \quad (5)$$

$$er = Wvr - Wvf \quad (6)$$

Subsequently, an aspect of performance corresponding to Claim 3 will be described.

Owing to the control logic explained above, the braking states of both the front and rear wheel sides can be brought into the vicinities of the peak μP of the curve of the μ-S characteristics substantially perfectly on, at least, the road of low μ. However, in a case, for example, where the motor vehicle in a high-speed drive state has been intensely braked and on the road surface whose friction coefficient μ is very high, the rear wheel side can fail to lock even when the oil pressure of the braking means for the rear wheel side has reached the maximum value physically producible.

In general, the braking control system is designed so that the physically producible oil pressure of the front wheel side is higher than that of the rear wheel side. Herein, in a case where the predetermined rate Srr mentioned before is not set at a comparatively large value, the front-wheel-side desired wheel speed Wrf is not considerably approached to the peak μP of the μ-S characteristics curve. Consequently, the braking torque of the front wheel side does not augment more in spite of the facts that a margin for the braking torque is left yet up to the peak μP of the μ-S characteristics curve, and that a margin for heightening the oil pressure is left yet up to the physical maximum value.

On such an occasion, therefore, the predetermined rate Srr is set somewhat larger, that is, the front-wheel-side desired wheel speed Wrf to be set lower relative to the rear-wheel-side actual wheel speed Wvr is set still lower.

More concretely, an example considered for this measure is such that the predetermined rate Srr is gradually enlarged in accordance with a certain time constant. Thus, the front-wheel-side desired wheel speed Wrf is approached more toward the peak μP. Thereafter, the predetermined rate Srr is fixed at the point of time at which the front wheel side has first shown the tendency to lock. Incidentally, when the tendency to lock continues still further, the predetermined rate Srr is made smaller contrariwise. In this way, the braking state of the front wheel side is permitted to come very close to the peak μP of the μ-S characteristics curve on each occasion. It is accordingly possible to avoid the situation where the braking system cannot demonstrate a satisfactory braking performance on account of the failure to increase the braking force of the braking means for the front wheel side on the high μ road.

Next, an aspect of performance corresponding to Claim 4 will be described.

As explained before, in the braking control of the present invention, the rear-wheel-side desired braking torque Nrr is set at the product of the front-wheel-side desired braking torque Nrf by the predetermined rate α. Therefore, the four wheels do not simultaneously lock, at least in the ideal state. As already explained, however, the actual road surface never has the uniform μ-S characteristics, and the μ-S characteristics themselves change easily due to the change of the steering angle. For such reasons, actually the rear wheel side will sometimes tend to lock earlier than the front wheel side.

Once the rear wheel side has shown the tendency to lock, since the braking for front wheel side is deepened or increased still more due to the algorithm of the control, it is possible to take place the simultaneous lock of the four wheels. The simultaneous lock of the four wheels is a very unstable state as the motor vehicle, and needs to be avoided to the utmost. Therefore, whether or not the rear wheel side has the tendency to lock is always monitored, and the braking pressure of the braking means for the rear wheel side is lowered upon judging the tendency of the rear wheel side to lock.

Herein, it is needless to say that the operation of "lowering the braking pressure of the braking means for the rear wheel side" can be realized concretely as the result of reducing the rear-wheel-side desired braking torque Nrr. Further, the operation can be realized by setting 0 (zero) as the predetermined rate α which is used in the case of calculating the rear-wheel-side desired braking torque Nrr from the front-wheel-side desired braking torque Nrf.

In this case, regarding the expression "lowering", the braking pressure may be lowered down towards 0 or may well be lowered a predetermined amount.

Incidentally, whether or not the rear wheel side has the tendency to lock can be judged by, for example, obtaining the higher one Wvr max of the rear-wheel-side actual wheel speeds Wvr and then detecting whether or not the differentiated value of the higher speed Wvr max is greater than a threshold value DVth. This judgement utilizes the fact that, when the pertinent wheel tends to lock, the wheel acceleration (deceleration) enlarges abruptly. The threshold value DVth can be preset. The reason why the differential value of the higher one of the rear-wheel-side actual wheel speeds Wvr is favorable as the criterion, is that the tendencies of both the rear wheels to lock can be reliably detected using the wheel speed of the wheel of less movement between the two rear wheels.

By the way, a practicable method for judging the lock state of the rear wheel side shall not be restricted to the above method. Further, in order to prevent the operation of this aspect of performance from being executed oftener than is necessary, the braking pressure of the braking means for the rear wheel side may well be lowered only upon the judgement of the tendencies of the four wheels to lock simultaneously. In this occasion, whether or not all the four wheels tend to lock is to be judged unlike the judgement of the tendency of only the rear wheel side to lock. This expedient may be realized by differentiating the maximum wheel speed Wv max of the four wheels and then comparing the differential value with a predetermined threshold value DV'th.

When the braking pressure for the rear wheel side has been lowered as explained above, the braking torque hardly acts on the rear wheel side. Therefore, the rear-wheel-side actual wheel speed Wvr resumes, and the simultaneous lock of the four wheels can be avoided. Moreover, the peak µP of the µ-S characteristics curve can be sought again from a state of low braking level. It is therefore possible to appropriately cope with even a situation where the rear wheel side (or the four wheels) has entered the tendency to lock due to, for example, the great change of the property of the road surface.

Here in this control, only the braking pressure for the rear wheel side is lowered. On the front wheel side, the braking at a level closer to the peak µP than the level for the rear wheel side on the µ-S characteristics curve is always realized by the PID control, so that the braking torque of the front wheel side effective for the braking performance is surely secured, without becoming 0 (zero).

Figure 3:
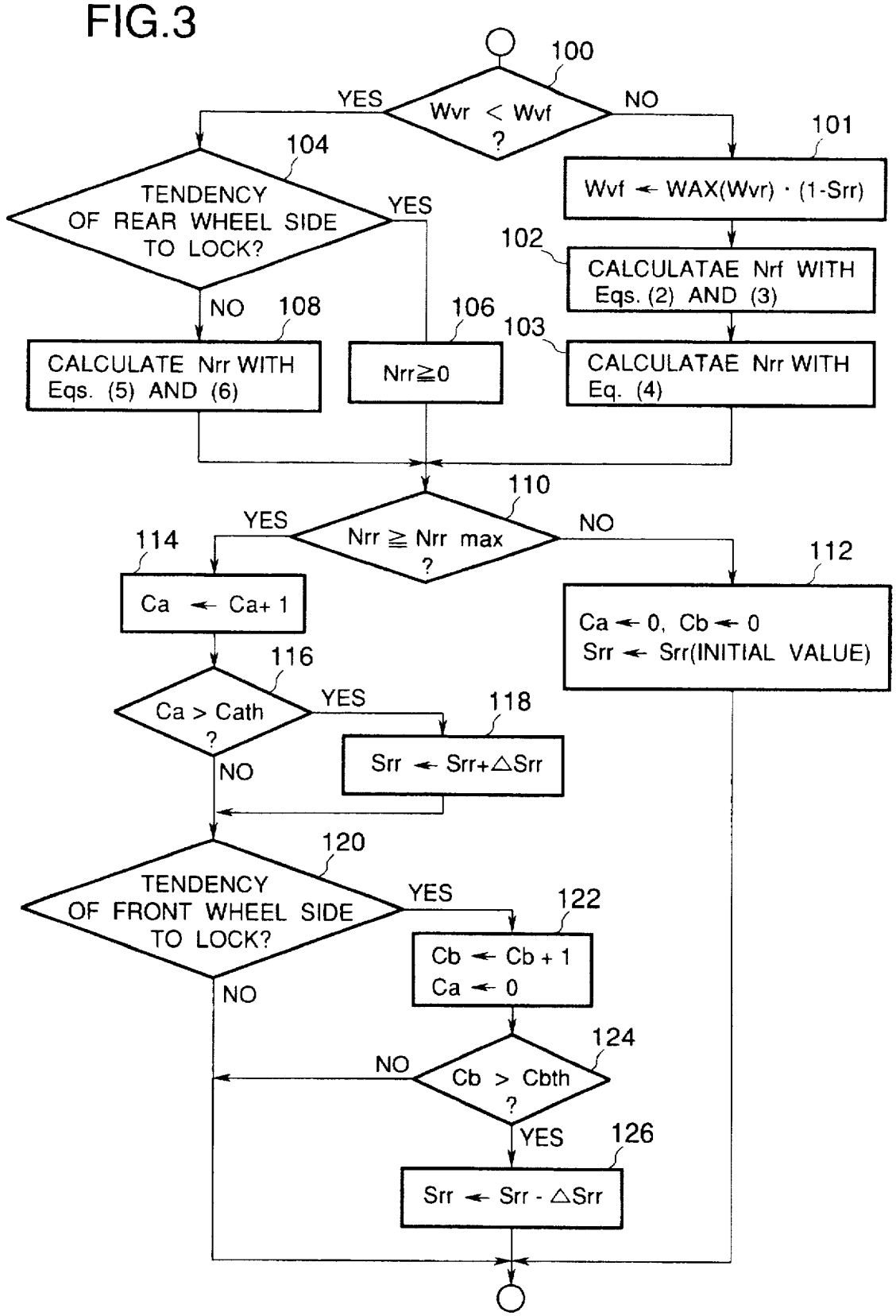
FIG. 3 is a flow chart showing a control flow which is executed by a PID control module in the aspect of performance of the present invention.

The algorithms thus far explained are collectively incarnated in the form of a flow chart in FIG. 3. Since the essential control contents have already been explained, only control steps shall be briefly described here.

Referring to FIG. 3, a route extending along steps 100, 101, 102 and 103 corresponds to one which is usually executed.

Here, the average value of the speeds of the two rear wheels is not adopted as the rear-wheel-side actual wheel speed Wvf, but the higher speed is adopted as such. This is based on the recognition that the wheel of less movement reflects the actual state of the rear wheel side more. Of course, however, the average value may well be adopted. Further, a deceleration limiter which is similar to that of the logic in the prior art may well be set for the average value.

A route flowing from the step 100 to the side of a step 104 corresponds to a case where the rear-wheel-side actual wheel speed Wvr has become lower than the front-wheel-side actual wheel speed Wvf due to any cause. First, whether or not the rear wheel side tends to lock is judged at the step 104. Upon the judgement of the tendency to lock, the control flow proceeds to a step 106 at which the rear-wheel-side desired braking torque Nrr is immediately reset to 0 (zero) in order to eliminate the tendency to lock.

When it has been judged at the step 104 that the rear wheel side is not in the lock state, the control flow proceeds to a step 108 at which the rear-wheel-side desired braking torque Nrr is calculated with Eqs. (5) and (6), not with Eq. (4) (because of the situation where the rear wheel side is not in the lock state, but where the rear-wheel-side actual wheel speed Wvr is lower than the front-wheel-side actual wheel speed Wvf). As a result, the braking pressure of the braking means for the rear wheel side is lowered, and the rear-wheel-side actual wheel speed Wvr can resume up to a level which is equal to the front-wheel-side actual wheel speed Wvf.

Steps 110–126 correspond to ones for judging whether or not the rear-wheel-side desired braking torque Nrr is substantially in the maximum condition, and for altering the predetermined rate Srr prescribing the relationship between the rear-wheel-side actual wheel speed Wvr and the front-wheel-side desired wheel speed Wrf when the judgement of the maximum condition is made, thereby to enlarge the difference of both the speeds Wvr and Wrf more.

More specifically, when it has been detected at the step 110 that the rear-wheel-side desired braking torque Nrr is not greater than the rear-wheel-side desired braking torque Nrr max physically producible by the braking control system, the value of a counter Ca is incremented at the step 114, where the counter Ca indicates the number of times which the inequality of Nrr≧Nrr max has been held. On the other hand, when the desired braking torque Nrr has been detected greater than the desired braking torque Nrr max at the step 110, the succeeding step 112 functions so that the counter Ca and a counter Cb are both reset to 0 (zero), where the counter Cb indicates the number of times which the tendency of the front wheel side to lock has been detected. Furthermore, the predetermined rate Srr is set at its initial value in the step 112. After the step 112, the routine is ended.

When it has been detected at the step 116 following the step 114 that the number of times Ca has become greater than a predetermined value Cath, it is judged that, although the braking state of the rear wheel side has reached the peak µP, the braking state of the front wheel side has a margin yet. At the next step 118, in order to approach the braking state of the front wheel side to the peak µP of the µ-S characteristics curve more, the predetermined rate Srr is increased a predetermined amount ΔSrr every cycle of the routine.

At the step 120 following the step 116 or 118, whether or not the front wheel side has tended to lock is judged. Unless the tendency to lock is judged, the control exits from the flow without any further processing. Eventually, therefore, after the stage (the step 116) at which the number of times Ca of the fulfillment of the inequality Nrr≧Nrr max has been detected larger than the number of times Cath, the predetermined rate Srr is consecutively increased until the tendency of the front wheel side to lock is judged. Thus, the braking state of the front wheel side is approached toward the peak µP in correspondence with the increase of the predetermined rate Srr every cycle.

When it has been judged at the step 120 in due course that the front wheel side has shown the tendency to lock, the control flow proceeds to the step 122, at which the counter Cb indicating the number of times of the judgement of the tendency to lock is incremented, while the counter Ca indicating the number of times of the detection of the inequality Nrr≧Nrr max is reset to 0 (zero). Owing to the resetting of the counter Ca, the decision "NO" is rendered at the step 116 for a while from the next cycle, and the increase of the predetermined rate Srr at the step 118 is suspended.

However, in a case where the inequality Nrr≧Nrr max continues to hold true thenceforth and where the lock state of the front wheel side has been detected in excess of a predetermined number of times Cbth (step 124), the lock occurs and ceases repeatedly (though the logic is adapted to eliminate the lock of the front wheel side by means of the PID control). In order to remove this critical state, therefore, the predetermined rate Srr is decreased the predetermined amount ΔSrr every cycle of the routine (step 126). As a result, the front wheel side comes to possess a grip force. The actual wheel speed of the pertinent front wheel is controlled into the vicinity of the peak µP by iterating the above processing.

By the way, in the flow chart of FIG. 3, whether or not the braking torque of the rear wheel side is under the maximum condition, is judged on the basis of the rear-wheel-side desired braking torque Nrr. Needless to say, however, it may well be judged on the basis of, for example, the braking pressure of the rear wheel side.

Subsequently, an aspect of performance corresponding to Claim 5 will be described.

As stated before, the official gazette of Japanese Patent Application Laid-open No. 502422/1993, for example, discloses the vehicle stability control (VSC) wherein, when the motor vehicle has undergone a spin, different braking forces to cancel the spin are afforded, thereby to stabilize the motor vehicle.

A case is considered where, during the execution of such a vehicle stability control (VSC), one wheel, for example, enters a road of low μ to lock suddenly. In the prior art, the continuity between the VSC and the ABS is not established. In order to ensure the braking performance in consideration of priority, accordingly, the VSC is changed-over to the ABS even midway of the execution of the former. This results in such inconveniences that the discontinuity of the vehicle stability arises at the time of the changeover, and that the VSC cannot be executed during the execution of the ABS.

In contrast, when the technical idea according to the present invention is applied, it is permitted to execute both the VSC and the ABS in unified fashion.

It is now supposed that a condition for executing to the vehicle stability control has been met, and that $\Delta Ff$ and $\Delta Fr$ are respectively required for the front wheel side and the rear wheel side as the desired braking torques which are afforded in order to stabilize the behavior or movement of the motor vehicle. Since the vehicle stability control is intended to righten the behavior of the motor vehicle, the concept of the "braking torques" is very reasonable as the parameter of the control.

Here, letting "plus" be in the direction of increasing the braking torque of each left wheel and letting symbols $Knf$ and $Knr$ denote torque conversion coefficients for the front and rear wheels, respectively, the VSC is permitted by setting the desired braking torques of the individual wheels as indicated by Eqs. (10) below. (For the sake of convenience, Eqs. (7), (8) and (9) shall be mentioned later.)

$$Nrfl=Knf \cdot \Delta Ff \text{ (Left front wheel)}$$

$$Nrfr=0 \text{ (Right front wheel)}$$

$$Nrrl=Knr \cdot \Delta Fr \text{ (Left rear wheel)}$$

$$Nrrr=0 \text{ (Right rear wheel)} \qquad (10)$$

By the way, in the case where the desired values of the differences between left and right are given as the differences $\Delta Sf$ and $\Delta Sr$ of the slip factors in accordance with the logic in the prior art, the desired braking torques of the respective wheels can be obtained by calculating the following Eqs. (11) and (12):

$$Nrfl=Kpf \cdot efv+Kdf \cdot dWvfl/dt+Kif \int efv \, dt+Cf \text{ (Left front wheel)}$$

$$Nrfr=0 \text{ (Right front wheel)}$$

$$Nrrl=Kpr \cdot erv+Kdr \cdot dWvrl/dt+Kif \int erv \, dt+Cr \text{ (Left rear wheel)}$$

$$Nrrr=0 \text{ (Right rear wheel)} \qquad (11)$$

$$efv=Wvfl-Wvfr(1-\Delta Sf)$$

$$erv=Wvrl-Wvrr(1-\Delta Sr) \qquad (12)$$

In a case where, on this occasion, at least one wheel has tended to lock suddenly, so the ABS control is required, the ABS control and the vehicle stability control can be simultaneously executed by setting the desired braking torques of the respective wheels as indicated by the following Eqs. (13):

$$Nrfl=Nrfl(ABS)+(1-\alpha f)Nrfl(VSC) \text{ (Left front wheel)}$$

$$Nrfr=Nrfr(ABS)-\Delta f \, Nrfl(VSC) \text{ (Right front wheel)}$$

$$Nrrl=Nrrl(ABS)+(1-\alpha r)Nrrl(VSC) \text{ (Left rear wheel)}$$

$$Nrrr=Nrrr(ABS)-\alpha r \, Nrrl(VSC) \text{ (Right rear wheel)}$$

$$0 \leq \alpha f \leq 1, 0 \leq \alpha r \leq 1 \qquad (13)$$

Here, symbols af and ar denote coefficients for distributing the desired braking torques Nrfl (VSC) and Nrrl (VSC) in the VSC as to the front wheel side and the rear wheel side, respectively. The reason why the desired braking torques Nrfl (VSC) and Nrrl (VSC) are distributed, is as stated below. In the situation where the ABS is executed, the wheels will be immediately before locking. Therefore, when braking torques of comparatively large values are bestowed on only one of the right and left sides, the pertinent wheels might become more liable to lock. This drawback is avoided by the above distribution.

Next, an aspect of performance corresponding to Claim 6 will be described.

There have hitherto been proposed "assist braking control" and "active braking control". An "assist braking control" is a control wherein, when the driver of a motor vehicle has stepped on the brake pedal suddenly in an emergency, great braking forces are afforded to the four wheels of the motor vehicle so as to assist the sudden braking operation. An "active braking control" is a control wherein, when the distance of the motor vehicle from another in front has become equal to, or smaller than a predetermined value, braking forces are forcibly afforded to the four wheels, or wherein, when a tendency to drift out due to an overspeed has been detected, braking forces are afforded to the four wheels so as to slow down the motor vehicle. These braking controls can also be adapted to the logic of the present invention by calculating desired braking torques NrA and inputting the calculated torques NrA to a hydraulic pressure control module.

Furthermore, even in a case where the wheels have tended to lock during the active bestowal of the braking torques and where the ABS has accordingly become necessary, the assist braking control or the active braking control can be shifted to the ABS without any problem merely by substituting the initial values Cf and Cr of the desired braking torques for the desired values of the assist or active braking control (which is converted into the desired braking torques) at that point of time.

Next, an aspect of performance corresponding to Claim 7 will be described.

The technical idea according to the present invention is also applicable in the traction control (TRC) of a motor vehicle either the front wheels or the rear wheels of which are driving wheels (2WD or 2-wheel drive vehicle).

Now, as an example, let's take a case where the rear wheels are the driving wheels. First, the actual wheel speed Wvf of the front wheel (driven wheel) side considered to correspond to the vehicle speed is obtained, and the desired wheel speed Wrr of the rear wheel (driven wheel) side set somewhat higher than the speed Wvf is calculated. Besides, the desired braking torque Nrr of the rear wheel side is evaluated by the PID control in order that the actual wheel speed Wvr of the rear wheel side may follow up the rear-wheel-side desired wheel speed Wrr, and the rear-wheel-side desired braking torque Nrr is realized. That is, the TRC of the 2WD vehicle can be incarnated by calculating the rear-wheel-side desired braking torque Nrr in accordance with:

$$Nrf=0 \qquad (7)$$

$$Nrr=Kpr \cdot err+Kdr \cdot dWvr/dt+Kir \int err \, dt+Cr \qquad (8)$$

$$err=Wvr-Wrr \qquad (9)$$

Incidentally, how to set the rear-wheel-side desired wheel speed Wrr higher than the front-wheel-side actual wheel speed Wvf is as follows. Unlike the logic described before, the logic in the TRC does not involve the operation of bringing the braking state toward the peak µP so as to establish the optimum braking state. Therefore, the desired wheel speed Wrr is directly set at a value which will attain a braking state considered to substantially correspond to the peak µP.

In this regard, accordingly, a problem similar to that of the prior art in the case of setting the desired slip factor remains. With the prior art, however, in order to realize the desired slip factor, the actual slip factor is detected, and the control is executed so as to bring the actual slip factor to the desired slip factor. Herein, the detection reliability of the actual slip factor itself is low as mentioned as the second problem, so that the precision of the control cannot avoid becoming very low. In contrast, according to this aspect of performance of the present invention, the actual slip factor is not detected, but the rear-wheel-side desired braking torque Nrr for realizing the rear-wheel-side desired wheel speed Wrr is calculated by the PID control, whereupon the TRC is executed so as to attain the rear-wheel-side desired braking torque Nrr. The control precision can therefore be remarkably heightened.

By the way, in the case of the TRC, the reference of the braking pressure for use in the hydraulic pressure control is a TRC accumulator pressure (as in the prior art) unlike a master cylinder pressure in the ABS control.

Besides, in evaluating the rear-wheel-side desired wheel speed Wrr, such parameters as an engine load and a wheel acceleration may be conjointly considered as in the case of setting the desired slip factor in the prior art.

In a case where the brake has been applied suddenly during the TRC and where the ABS has accordingly become necessary, the optimum control can be continuously executed merely by substituting the computations of the front-wheel-side desired braking torque Nrf and rear-wheel-side desired braking torque Nrr based on Eqs. (7), (8) and (9), for ones based on Eqs. (2) and (3) or based on Eq. (5). It is accordingly quite unnecessary to take such a measure in the prior art that the logic items of the ABS control and the TRC are separately prepared and that a patch is applied so as to avoid any inconvenience at the changeover between both the controls.

Lastly, there will be described a practicable hardware architecture for incarnating the braking control of the present invention, and a method for actually calculating the switching or control time of each hydraulic pressure control valve in a hydraulic pressure control circuit from a desired braking torque.

Figure 4:
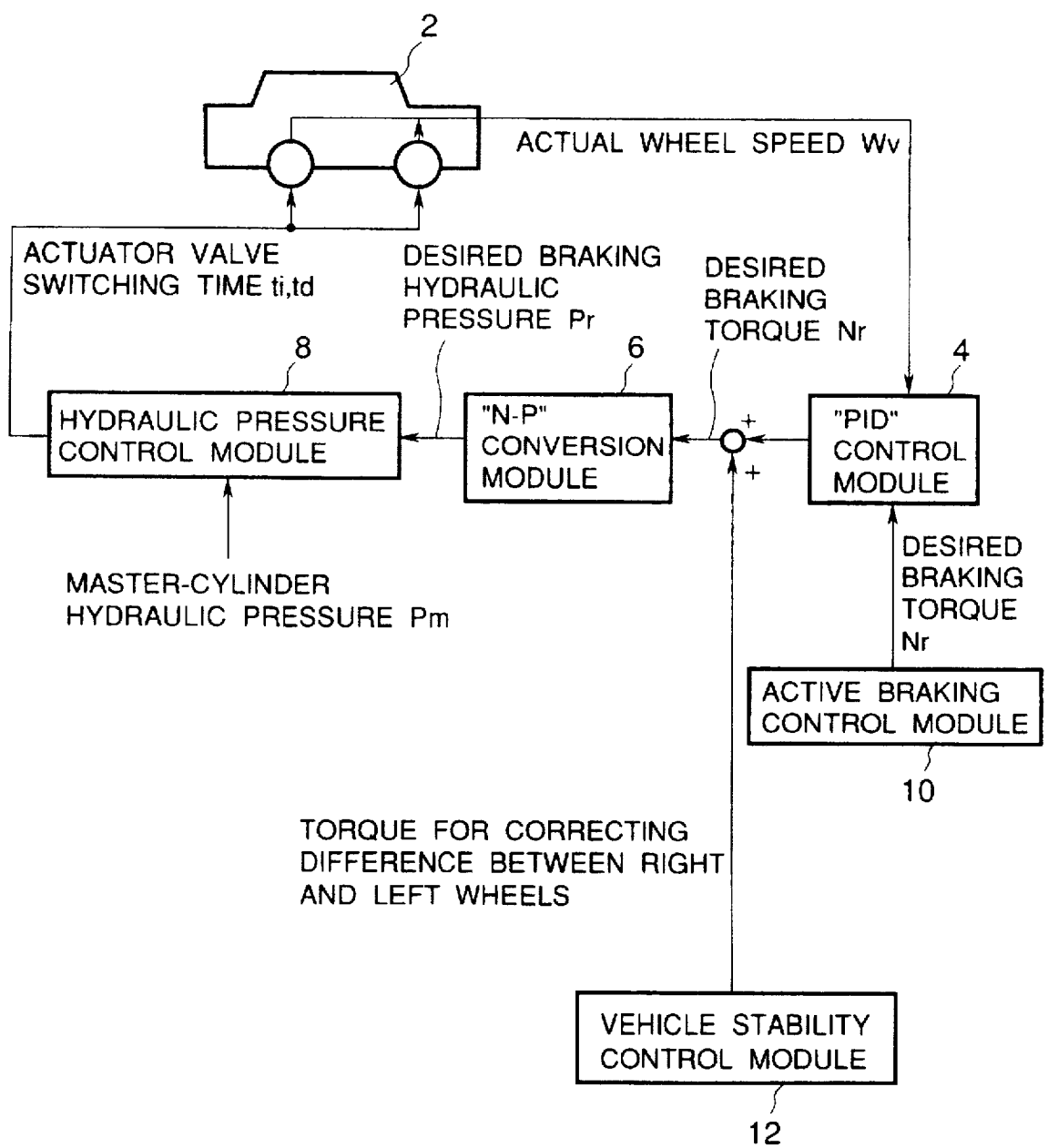
FIG. 4 is a block diagram showing the schematic construction of the whole aspect of performance of the present invention.
Figure 5:
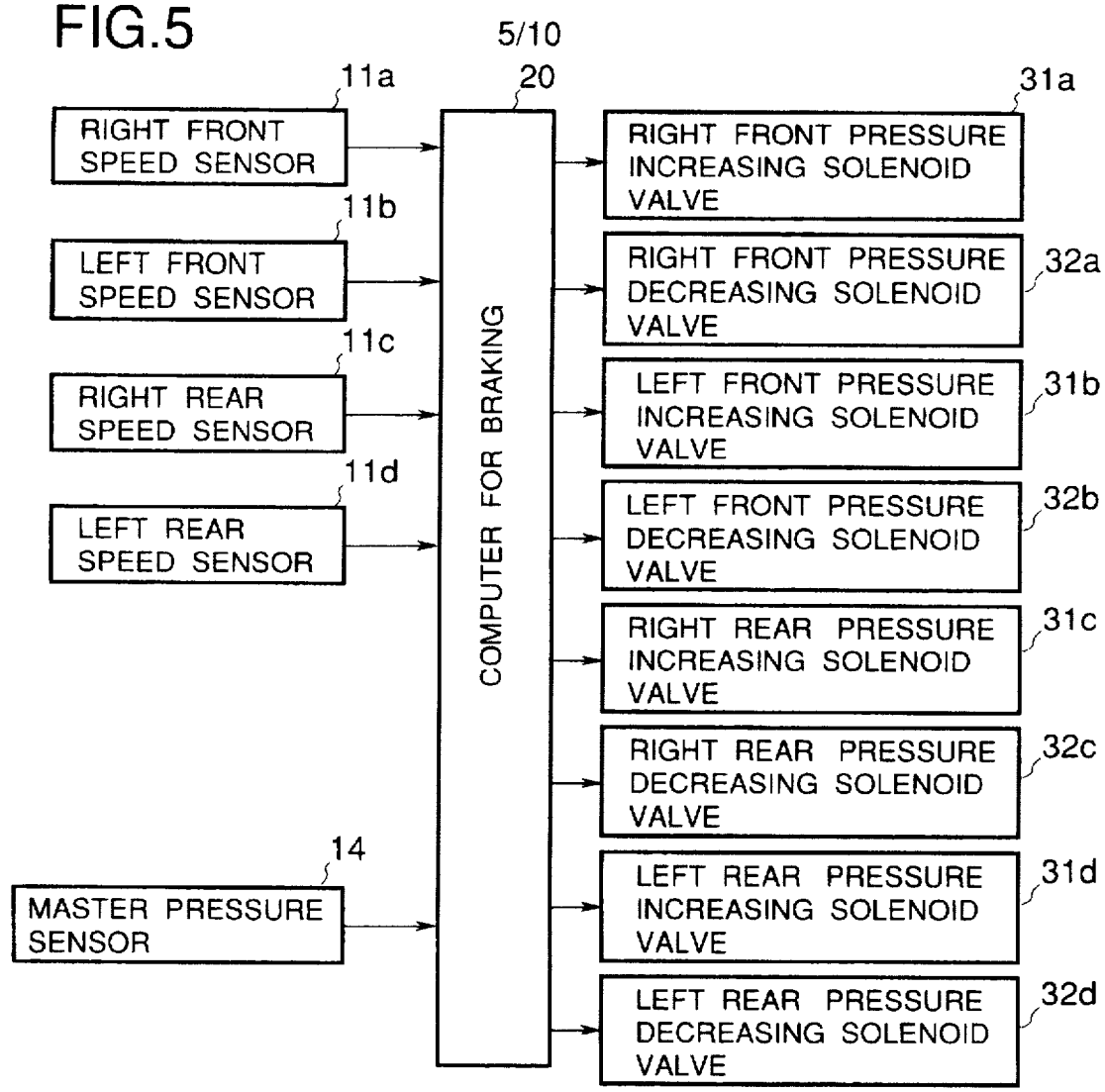
FIG. 5 is a block diagram showing the arrangement of a control circuit.

FIG. 4 illustrates the schematic construction of a vehicular braking control system according to one aspect of performance of the present invention, while FIG. 5 illustrates a control circuit therefor.

This aspect of performance consists in a braking force control system for a motor vehicle as is so constructed that a hydraulic pressure (master cylinder pressure) Pm generated by the master cylinder of the known unshown braking device (braking means) of the motor vehicle 2, is controlled to increase or decrease in accordance with the drive state of the motor vehicle 2 (independently of a braking operation by the driver of the motor vehicle). The braking force control system comprises a PID control module 4 which receives an actual wheel speed Wv and which calculates a desired braking torque Nr on the basis of the actual wheel speed Wv by the PID control as explained before, an N-P conversion module 6 which converts the desired braking torque Nr into a desired braking hydraulic pressure Pr, and a hydraulic pressure control module 8 which calculates a valve control time ti for a pressure increase or a valve control time td for a pressure decrease, the valve control time td, ti being required for realizing the desired braking hydraulic pressure Pr.

The PID control module 4 also receives input information, such as a desired initial torque, from an active braking control module 10. A vehicle stability control module 12 delivers information of a braking torque for correcting a difference in the lateral direction (right-left direction) of the motor vehicle 2. The output of the PID control module 4 is added together with the information, and thereafter, is applied to the N-P conversion module 6.

The details of the control in the PID control module 4 are as have already been elucidated.

The hydraulic pressure control module 8 calculates an estimative braking hydraulic pressure P which is estimated to be currently acting in the braking device, by the use of a hydraulic pressure model from the master cylinder pressure Pm generated by the master cylinder and the desired braking hydraulic pressure Pr mentioned above. Besides, the hydraulic pressure control module 8 calculates the valve control time ti or td from the estimative braking hydraulic pressure P and the desired braking hydraulic pressure Pr calculated by the N-P conversion module 6. The value control time ti or td is a time to increase or decrease the pressure for realizing the target braking hydraulic pressure Pr.

In actuality, the roles of the PID control module 4, N-P conversion module 6 and hydraulic pressure control module 8 are filled by a computer for braking 20 shown in FIG. 5. More specifically, the computer 20 detects the actual wheel speed Wv of each wheel by the corresponding one of wheel speed sensors $11a \sim 11d$, and the master cylinder pressure Pm by a master pressure sensor 14. The computer 20 also calculates the valve control time ti or td, and controls each of solenoid valves $31a \sim 31d$ and $32a \sim 32d$ for a time corresponding to the calculated valve control time ti or td.

First, there will be explained a method for converting the desired braking torque Nr into the desired braking hydraulic pressure Pr in the N-P conversion module 6.

Although this method has already been proposed in detail in the specification of Japanese Patent Application No. 54474/1995 by the same inventors as those of the present application, it is not publicly known at present yet, and hence, it will be briefly, explained here. Incidentally, the present invention shall not be especially restricted as to how the braking pressure of the braking means is concretely controlled on the basis of the desired braking torque.

Usually, the desired braking hydraulic pressure Pr is considered proportional to the desired braking torque Nr. It can therefore be given as the following Eq. (14):

$$Pr = K^3 Nr (K^3 : \text{Constant}) \tag{14}$$

Since, however, the rear wheel side usually includes a (known) P valve (proportioning valve), the desired braking hydraulic pressure Pr thereof is given by a map in which the characteristics of the P valve are taken into account. Accordingly, the pressure Pr can be written as indicated by the following Eq. (15):

$$Pr = Pr(Nr) \tag{15}$$

Next, a method for evaluating the valve control time ti, td in the hydraulic pressure control module 8 will be explained.

When a hydraulic actuator is brought into the form of a hydraulic pressure model in accordance with a flow-rate model and the variation of a brake rigidity dependent upon the quantity of brake fluid or oil, the following Eqs. (16) and (17) are held in case of a pressure increase model:

$$dp/dt = Kai\sqrt{Pm-P} \quad (16)$$

$$K = k\int ai\sqrt{Pm-P} \cdot dt \quad (17)$$

Here, letter P denotes an estimative braking hydraulic pressure, symbol Pm the master cylinder pressure, letter K the brake rigidity, and symbol ai a quantity relevant to a pressure increasing valve control (hydraulic-pressure time constant). Also, letter k denotes a constant. Besides, the integral is executed during a pressure increasing operation from a time t=0 till a time t=t.

On the other hand, in case of a pressure decrease model, the following Eqs. (18) and (19) are held:

$$dp/dt = -k\,ad\sqrt{P-Pres} \cdot dt \quad (18)$$

$$K = k\int ad\sqrt{P-Pres} \cdot dt \quad (19)$$

Here, symbol Pres denotes a reservoir pressure, and symbol ad a quantity relevant to a pressure decreasing valve control (hydraulic-pressure time constant). Besides, the integral is executed during a pressure decreasing operation from a time t=tf-t till a time t=tf.

When Eqs. (16) and (17) are solved by letting symbol P(k-1) denote the estimative braking hydraulic pressure before the pressure increase and symbol ti denote the valve control time period for the pressure increase, the estimative braking hydraulic pressure P(k) at the current point of time is given by the following Eq. (20):

$$P(k) = [Pm + 2\sqrt{PmP(k-1)-P(k-1)^2} \cdot \quad (20)$$
$$\sin(ai\sqrt{2k} \cdot ti) -$$
$$\{Pm - 2P(k-1)\} \cdot$$
$$\cos(ai\sqrt{2} k \cdot ti)]/2$$

Likewise, when Eqs. (18) and (19) are solved by letting symbol td denote the valve control time period for the pressure decrease, the following equation (21) is obtained:

$$P(k) = Pres + \{P(k-1) - Pres\} \cdot \quad (21)$$
$$\exp(-ad\sqrt{2k} \cdot td)$$

Next, there will be explained a method for evaluating the valve control time ti or td by the use of the reverse hydraulic pressure model.

When Eqs. (20) and (21) are respectively solved as to the valve control time ti for the pressure increase and the valve control time td for the pressure decrease by substituting the desired braking hydraulic pressure Pr into the estimative braking hydraulic pressure P(k), the following Eqs. (22) and (23) are obtained:

$$ti = \{\cos^{-1}(1-2Pr/Pm) - \quad (22)$$
$$\cos^{-1}\{1-2P(k-1)/Pm\}\}/(ai\sqrt{2k})$$

$$td = [\ln\{P(k-1)-Pres\} - \quad (23)$$
$$\ln(Pr-Pres)]/(ad\sqrt{2k})$$

Figure 6:
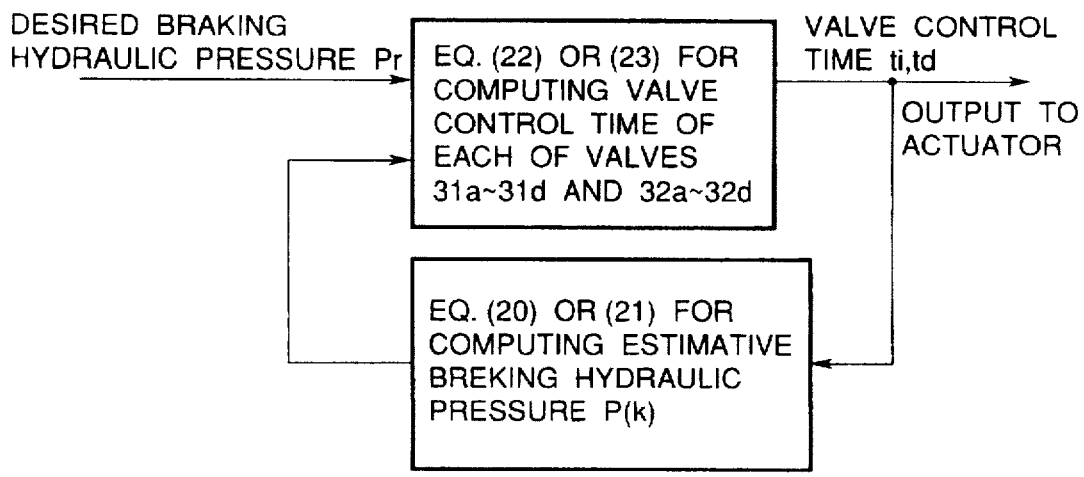
FIG. 6 is a block diagram showing the function of a hydraulic pressure control module.

The above description is schematized as illustrated in FIG. 6. The valve control time ti or td is calculated from the desired braking hydraulic pressure Pr by the corresponding Eq. (22) or (23). To the contrary, the current estimative braking hydraulic pressure P(k) is calculated from the valve control time ti or td by the corresponding Eq. (20) or (21).

The aforementioned calculations are all executed by the computer 20 shown in FIG. 5. A practicable algorithm therefor is illustrated as a flow chart in FIG. 7.

Figure 7:
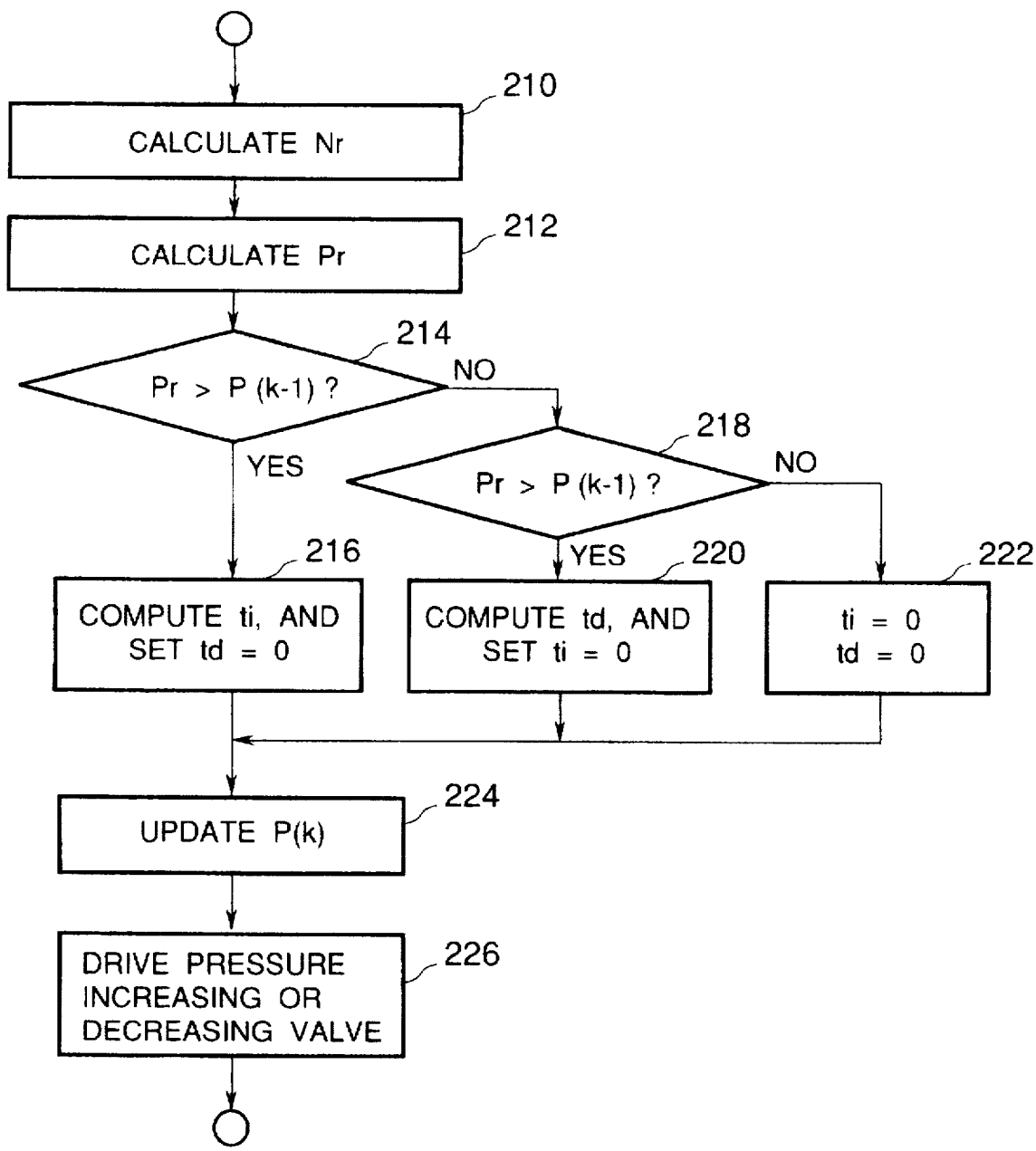
FIG. 7 is a flow chart showing a control flow from the calculation of a desired braking torque to the driving control of a valve.

By the way, the calculations shown in FIG. 7 shall be executed in a fixed cycle as to every wheel.

When the desired braking torque Nr has been given from the side of the PID control module 4 at a step 210, the desired braking hydraulic pressure Pr is computed in conformity with Eq. (14) or Eq. (15) at a step 212. Subsequently, the estimative braking hydraulic pressure P(k-1) in the last cycle and the desired braking hydraulic pressure Pr are compared at a step 214. If the hydraulic pressure Pr is greater than the hydraulic pressure P(k-1) (that is, if Pr>P(k-1) is held), the valve control time ti for the pressure increase is computed in conformity with Eq. (22) at the next step 216, the valve control time td for the pressure decrease being set to 0 (zero).

On the other hand, if the desired braking hydraulic pressure Pr is not greater than the estimative braking hydraulic pressure P(k-1) in the last cycle (that is, if Pr≧P(k-1) is held) in the decision of the step 214, the control flow of the algorithm proceeds to a step 218, at which the desired braking hydraulic pressure Pr is compared again with the estimative braking hydraulic pressure P(k-1) in the last cycle. If the desired braking hydraulic pressure Pr is smaller (that is, if Pr<P(k-1) is held), the valve control time td for the pressure decrease is computed in conformity with Eq. (23) at a step 220, the valve control time ti for the pressure increase being set to 0 (zero). In contrast, if the desired braking hydraulic pressure Pr is not smaller than the estimative braking hydraulic pressure P(k-1) in the last cycle in the decision of the step 218, then Pr=P(k-1) is held, and hence, both the valve control times ti and td are set to 0 (zero) at a step 222.

Subsequently, at a step 224, the value of the estimative braking hydraulic pressure P(k) is updated in conformity with Eq. (20) under the condition Pr>P(k-1) and in conformity with Eq. (21) under the condition Pr<P(k-1). In addition, the value of the estimative braking hydraulic pressure P(k-1) in the last cycle is held as it is, under the condition Pr=P(k-1).

Finally, at a step 226, the corresponding one of the valves 31a~31d and 32a~32d is driven on the basis of the valve control time ti or td computed in the above. Thus, the pressure increase or decrease control is carried out.

Meanwhile, in this aspect of performance, the P valve is included in the hydraulic circuit of the rear wheel side, so that pressure increasing or decreasing gradient of the actual braking hydraulic pressure on the rear wheel side changes before and behind the bend point of the P valve. For this reason, a contrivance as stated below is made in the hydraulic pressure control module 8.

In evaluating the estimative braking hydraulic pressure P by means of the hydraulic pressure control module 8, the existence of the P valve makes it impossible to estimate the hydraulic pressure P just as the actual braking hydraulic pressure if the hydraulic-pressure time constants ai and ad are uniquely determined. Therefore, the value of each of the hydraulic-pressure time constants ai and ad is altered before and behind the bend point of the P valve so as to realize the control as desired.

Figure 8:
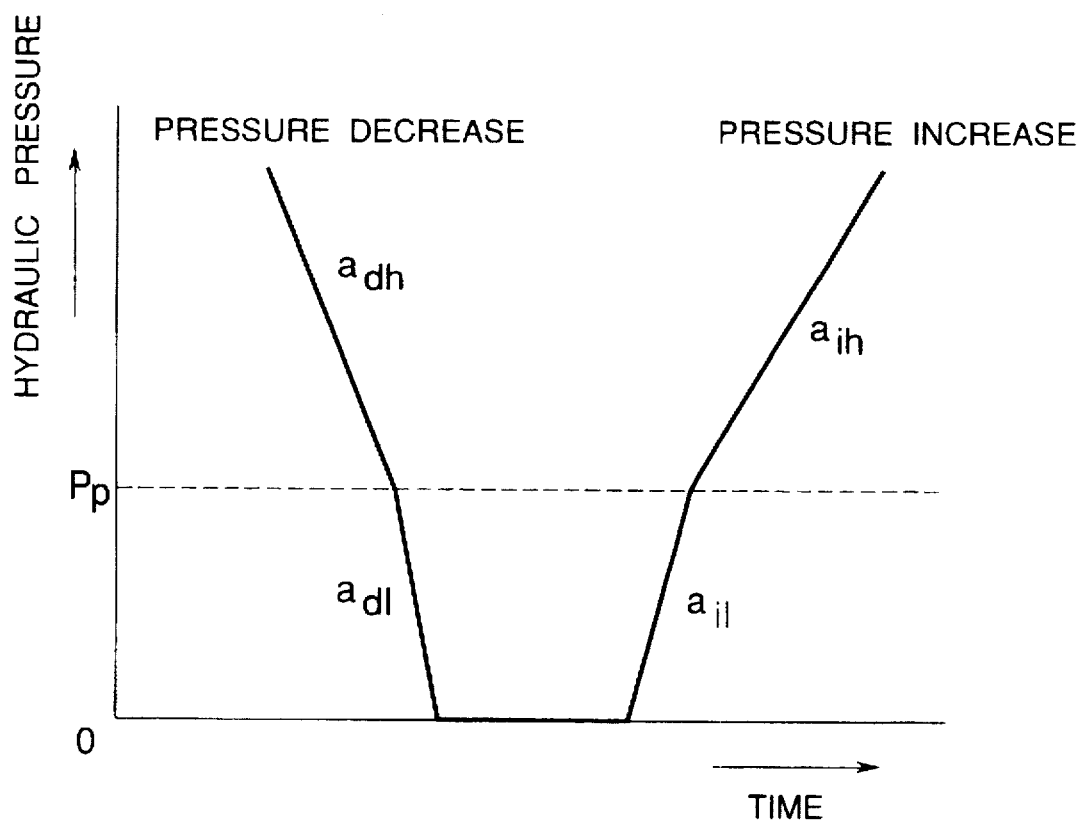
FIG. 8 is a graph showing variations in an estimative braking hydraulic pressure on the rear wheel side of a motor vehicle.

FIG. 8 is a graph showing the changes of the estimative braking hydraulic pressure P on the rear wheel side. Referring to the figure, symbol Pp denotes the hydraulic pressure of the predetermined bend point of the P valve. Symbols aih and adh indicate the values of the hydraulic-pressure time constants ai and ad on a high pressure side relative to the pressure Pp, respectively. Likewise, symbols ail and adl indicate the values of the hydraulic-pressure time constants ai and ad on a low pressure side relative to the pressure Pp, respectively.

Figure 9:
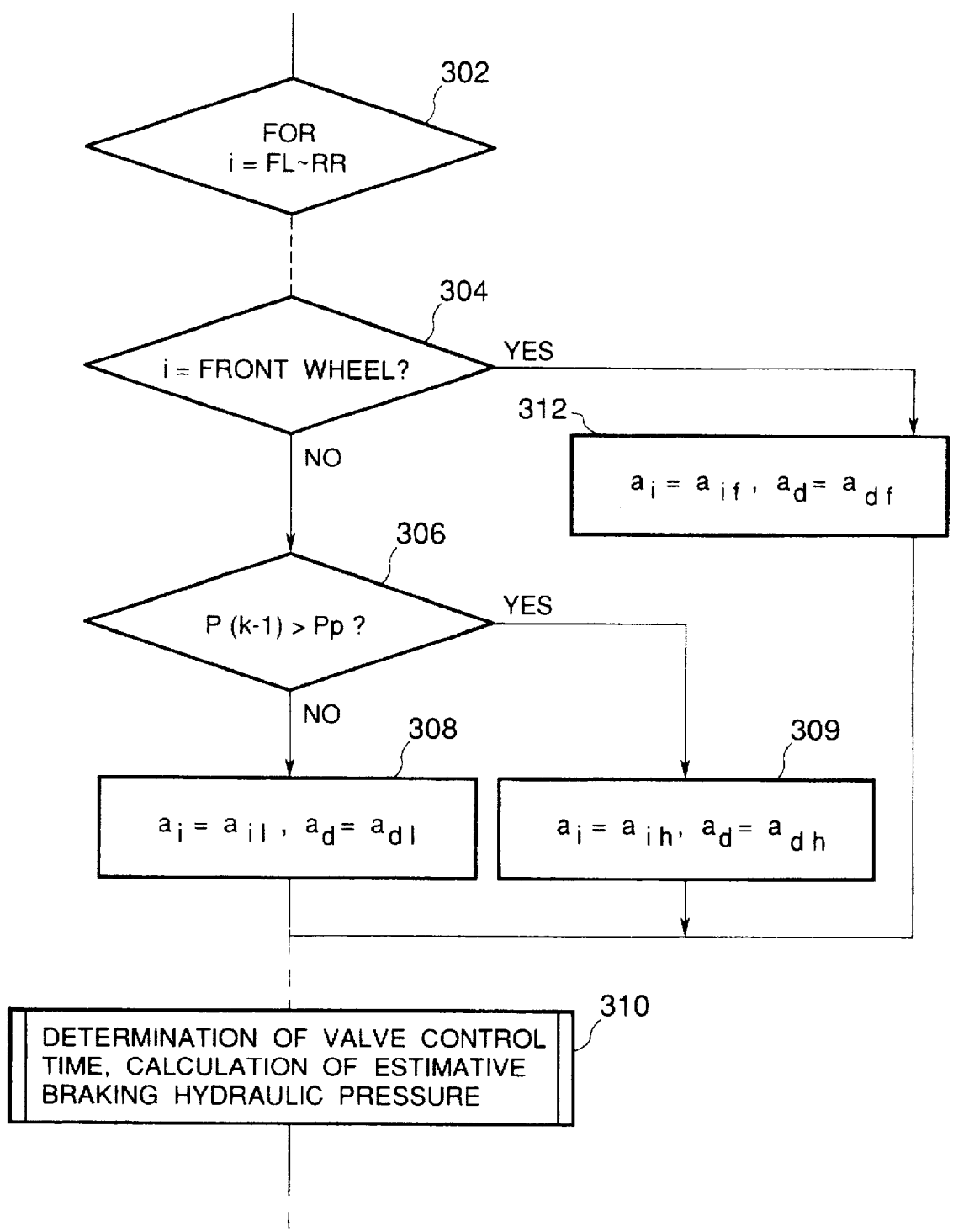
FIG. 9 is a flow chart showing a control flow in which the influence of a P (proportional) valve is considered.

In addition, FIG. 9 is a flow chart showing the control correspondent to FIG. 8.

First, which of the four wheels of the motor vehicle is to be currently processed (calculated) is decided at a step 302 in FIG. 9. Thus, the loop of a pertinent program is started, and it is iterated for the four wheels. In a case where the wheel to be processed has been decided the front wheel at a step 304, the time constants ai and ad need not be altered before and behind the bend point of the P valve. Therefore, the control flow proceeds to a step 312, at which the hydraulic-pressure time constants ai and ad of Eqs. (20) and (22) and Eqs. (21) and (23) are respectively set to the hydraulic-pressure time constants aif and adf for the pressure increasing and decreasing operations. Here, the time constants aif and adf are conformed to the pressure increasing and decreasing gradients of the front wheel side respectively. Then, the step 312 is followed by a step 310.

On the other hand, in case of the decision at the step 304 that the wheel to be processed is not the front wheel, but that it is the rear wheel, the estimative braking hydraulic pressure P(k−1) (in the last cycle) already estimated is compared with the pressure Pp of the bend point of the P valve at the next step 306. If the estimative braking hydraulic pressure P(k−1) in the last cycle is higher than the pressure Pp, the control flow proceeds to a step 314, at which the hydraulic-pressure time constants ai and ad are respectively set to the high-pressure-side time constants aih and adh, and which is followed by the step 310. Further, if the estimative braking hydraulic pressure P(k−1) in the last cycle is not higher than the pressure Pp, the control flow proceeds to a step 308, at which the hydraulic-pressure time constants ai and ad are respectively set to the low-pressure-side time constants ail and adl, and which is followed by the step 310.

At the step 310, the valve control times ti and td are determined to calculate the estimative braking hydraulic pressures P(k) with Eqs. (20) and (22) and Eqs. (21) and (23), respectively.

According to this aspect of performance, the hydraulic-pressure time constant ai or ad conformed-to the difference of the pressure increasing or decreasing gradients before and behind the bend point of the P valve is selected, so that the estimation precision of the estimative braking hydraulic pressure P(k) can be more heightened to enhance the performance of the control to the desired braking hydraulic pressure Pr accordingly.

As thus far described, the present invention can bring forth the excellent effect that various braking controls which include the ABS, the TRC, the VSC, etc. can be realized comprehensively, with accuracy and without any inconvenience, owing to the disuse of such parameters as a desired slip factor, an estimative vehicle speed and/or an actual slip factor.

What is claimed is:

1. A braking control system for a motor vehicle having braking means capable of controlling a braking force of the motor vehicle independently of a braking operation done by a driver, comprising:

means for detecting an actual wheel speed of a front wheel side of said motor vehicle;

means for detecting an actual wheel speed of a rear wheel side of said motor vehicle;

means for setting that desired wheel speed of said front wheel side which is lower than the actual wheel speed of said rear wheel side, on the basis of the detected actual wheel speed of said rear wheel side;

means for calculating a deviation between the desired wheel speed of said front wheel side and the actual wheel speed thereof;

means for calculating a desired braking torque of said front wheel side on the basis of the deviation of said front wheel side and said actual wheel speed thereof;

means for setting a desired braking torque of said rear wheel side on the basis of the desired braking torque of said front wheel side; and means for controlling a braking pressure of said braking means on the basis of said desired braking torque of said front wheel side and the desired braking torque of said rear wheel side.

2. A braking control system for a motor vehicle as defined in claim 1, further comprising:

means for detecting whether or not said actual wheel speed of said rear wheel side has become lower than said actual wheel speed of said front wheel side;

wherein upon the detection that said actual wheel speed of said rear wheel side has become lower than said actual wheel speed of said front wheel side, said desired braking torque of said rear wheel side is set so that said actual wheel speed (Wvr) of said rear wheel side may become equal to said actual wheel speed (Wvf) of said front wheel side.

3. A braking control system for a motor vehicle as defined in claim 1, further comprising:

means for judging whether or not a braking torque of said rear wheel side is substantially in a maximum condition of said braking control system;

wherein upon the judgement that the braking torque of said rear wheel side is substantially in the maximum condition, said desired wheel speed of said front wheel side is set still lower.

4. A braking control system for a motor vehicle as defined in claim 1, further comprising:

means for detecting whether or not said rear wheel side has a tendency to lock;

wherein upon the detection that said rear wheel side has the tendency to lock, the braking pressure of said braking means for said rear wheel side is lowered.

5. A braking control system for a motor vehicle as defined in claim 1, further comprising:

means for detecting vehicle behavior characteristics; and means for calculating a second desired braking torque which serves to generate a braking torque difference in a right-left direction of said motor vehicle, on the basis of the vehicle behavior characteristics;

wherein said means for controlling the braking pressure of said braking means controls said braking pressure by taking also the second desired braking torque into consideration.

6. A braking control system for a motor vehicle as defined in claim 1, further comprising:

forcible-braking-force impartation means for forcibly imparting a braking force when a specified condition is met; and means for calculating a third desired braking torque on the basis of the braking force imparted by said forcible-braking-force impartation means;

wherein said means for controlling the braking pressure of said braking means controls said braking pressure by taking also the third desired braking torque into consideration.

7. A braking control system for a motor vehicle of two-wheel drive with driving wheels and driven wheels, wherein braking means capable of controlling a braking force of the motor vehicle independently of a braking operation done by a driver is installed in order to prevent the motor vehicle from slipping during acceleration thereof, comprising:

means for detecting an actual wheel speed of a driving wheel side of said motor vehicle;

means for detecting an actual wheel speed of a driven wheel side of said motor vehicle;

means for setting that desired wheel speed of said driving wheel side which is higher than the actual wheel speed of said driven wheel side, on the basis of the detected actual wheel speed of said driven wheel side;

means for calculating a deviation between the desired wheel speed of said driving wheel side and the actual wheel speed thereof;

means for calculating a desired braking torque of said driving wheel side on the basis of the deviation of said driving wheel side and said actual wheel speed thereof; and means for controlling a braking pressure of said braking means on the basis of the desired braking torque of said driving wheel side.

* * * * *